(12) United States Patent
Ho et al.

(10) Patent No.: US 9,328,661 B2
(45) Date of Patent: May 3, 2016

(54) APPARATUS FOR AIRCRAFT WITH HIGH PEAK POWER EQUIPMENT

(71) Applicant: Northrop Grumman Systems Corporation, Falls Church, VA (US)

(72) Inventors: YuHang Ho, Torrance, CA (US); Jeffrey A. Knowles, Yorba Linda, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 603 days.

(21) Appl. No.: 13/667,079

(22) Filed: Nov. 2, 2012

(65) Prior Publication Data

US 2013/0111917 A1    May 9, 2013

Related U.S. Application Data

(60) Provisional application No. 61/555,010, filed on Nov. 3, 2011.

(51) Int. Cl.

| F02C 6/08 | (2006.01) |
|---|---|
| F02C 3/13 | (2006.01) |
| F02C 7/36 | (2006.01) |
| F02C 7/32 | (2006.01) |
| F02C 7/00 | (2006.01) |
| B64D 13/06 | (2006.01) |
| B64D 41/00 | (2006.01) |

(52) U.S. Cl.
CPC . *F02C 7/00* (2013.01); *B64D 13/06* (2013.01); *B64D 41/00* (2013.01); *F02C 3/13* (2013.01); *F02C 6/08* (2013.01); *F02C 7/32* (2013.01); *F02C 7/36* (2013.01); *B64D 2013/0611* (2013.01); *B64D 2013/0614* (2013.01); *B64D 2013/0674* (2013.01); *B64D 2013/0696* (2013.01); *Y02T 50/44* (2013.01); *Y02T 50/53* (2013.01); *Y02T 50/56* (2013.01); *Y02T 50/672* (2013.01)

(58) Field of Classification Search
CPC ............... F02C 6/08; F02C 3/13; F02C 7/36; B64D 2013/0614; Y02T 50/53
See application file for complete search history.

(56) References Cited

U.S. PATENT DOCUMENTS

| 4,494,372 | A | | 1/1985 | Cronin | |
|---|---|---|---|---|---|
| 4,503,666 | A | * | 3/1985 | Christoff | B64D 13/06 60/39.183 |
| 4,684,081 | A | | 8/1987 | Cronin | |
| 5,104,062 | A | | 4/1992 | Glaze | |
| 5,442,905 | A | * | 8/1995 | Claeys | B64D 13/06 454/71 |

(Continued)

FOREIGN PATENT DOCUMENTS

| EP | 1173673 B1 | 6/2009 |
|---|---|---|
| WO | 0059780 A2 | 10/2000 |

*Primary Examiner* — Phutthiwat Wongwian
*Assistant Examiner* — William Breazeal
(74) *Attorney, Agent, or Firm* — Robert P. Lenart; Pietragallo Gordon Alfano Bosick & Raspanti, LLP (57) ABSTRACT

An apparatus is provided for supplying electrical power and cooling for an aircraft. The apparatus includes a cooling turbine coupled to a shaft, a compressor coupled to the shaft, and including an input for receiving engine bleed air or ambient air, and an output for discharging compressed air, a flywheel coupled to the shaft, a power turbine coupled to the shaft, and a starter generator coupled to the shaft between the compressor and the power turbine.

11 Claims, 8 Drawing Sheets

(56) References Cited

U.S. PATENT DOCUMENTS

| | | |
|---|---|---|
| 5,490,645 A | 2/1996 | Woodhouse |
| 5,762,156 A * | 6/1998 | Bates et al. .................. 180/165 |
| 6,415,595 B1 | 7/2002 | Wilmot, Jr. et al. |
| 6,776,002 B1 | 8/2004 | Ho |
| 6,845,630 B2 | 1/2005 | Bruno et al. |
| 6,948,331 B1 | 9/2005 | Ho |
| 7,042,108 B2 | 5/2006 | Farkas |
| 7,116,003 B2 | 10/2006 | Hoppe |
| 7,380,749 B2 * | 6/2008 | Fucke .................... B64D 13/06 244/118.5 |
| 7,468,561 B2 | 12/2008 | Kern et al. |
| 7,550,866 B2 | 6/2009 | Breit et al. |
| 7,624,592 B2 * | 12/2009 | Lui et al. .......................... 62/402 |
| 7,687,927 B2 | 3/2010 | Shander et al. |
| 7,692,331 B2 | 4/2010 | Langlois et al. |
| 2002/0145076 A1 | 10/2002 | Alford |
| 2005/0173925 A1 | 8/2005 | Farkas |
| 2009/0104493 A1 | 4/2009 | Metzler et al. |
| 2009/0121546 A1 | 5/2009 | Langlois et al. |
| 2011/0154805 A1 * | 6/2011 | Heathco et al. .............. 60/226.1 |

\* cited by examiner

APPARATUS FOR AIRCRAFT WITH HIGH PEAK POWER EQUIPMENT

CROSS-REFERENCE TO A RELATED APPLICATION

This application claims the benefit of U.S. Provisional Patent Application Ser. No. 61/555,010, filed Nov. 3, 2011, and titled "Apparatus and System Design for Aircraft with High Peak Power Requirement", which is hereby incorporated by reference.

FIELD OF THE INVENTION

This invention relates to electrical power systems, and more particularly to power systems that are capable of satisfying short term peak power demands.

BACKGROUND OF THE INVENTION

High performance aircraft require a light weight cooling and power system that has a low impact on the propulsion engine. Such aircraft also need an auxiliary and emergency power source that can provide electrical power both on the ground and in the event of an engine flame out or main generator failure.

Aircraft may also include equipment that requires a high peak power. Such equipment requires power extraction beyond the capability of state-of-the-art (SOA) engine high pressure spool driven generators. Discharging high peak power may affect the normal system operation. If the high peak power equipment has a low usage duty cycle, sizing the generator to provide the peak power imposes a weight penalty that is undesirable when there is only an occasional need for a high peak power output.

A high power density energy storage device, effective high altitude auxiliary power, and thermal management are needed to support the high peak power equipment. In addition, a robust electrical power system architecture is required to manage electrical power distribution.

SUMMARY OF THE INVENTION

In one aspect, the invention provides an apparatus for supplying electrical power and cooling for an aircraft. The apparatus includes a cooling turbine coupled to a shaft, a compressor coupled to the shaft, and including an input for receiving engine bleed air or ambient air, and an output for discharging compressed air, a flywheel coupled to the shaft, a power turbine coupled to the shaft, and a starter generator coupled to the shaft between the compressor and the power turbine.

In another aspect, the invention provides a method for providing electrical power and cooling for an aircraft, the method including: connecting a starter generator to an energy accumulator bus; selectively connecting the energy accumulator bus to a first power distribution unit in a first power channel or a second power distribution unit in a second power channel; wherein the starter generator is coupled to a shaft in an integrated power and cooling unit that includes a cooling turbine coupled to the shaft; a compressor coupled to the shaft and including an input for receiving engine bleed air or ambient air and an output for discharging compressed air; a flywheel coupled to the shaft; and a power turbine coupled to the shaft; and using energy stored in the flywheel to rotate the shaft enabling the starter generator to supply electrical power to the energy accumulator bus.

DETAILED DESCRIPTION OF THE INVENTION

In one aspect, the invention provides an integrated flywheel power and cooling system (IFWPCS) for an aircraft. In another aspect, the invention provides a power system distribution architecture that operates in combination with the integrated flywheel power and cooling system.

Aircraft power and cooling systems can be driven by an aircraft engine, for example, using bleed air from the engine. During idle descent flight of an aircraft, engine power extraction and bleed air capability is low and would result in a high penalty if used to drive the power and cooling system. An IFWPCS can use stored energy (e.g., rotation of a flywheel) to assist with power generation and cooling during idle descent flight. In addition, the IFWPCS can provide improved system performance as compared to the state of the art technologies that would be required to enable similar capability.

Figure 1:
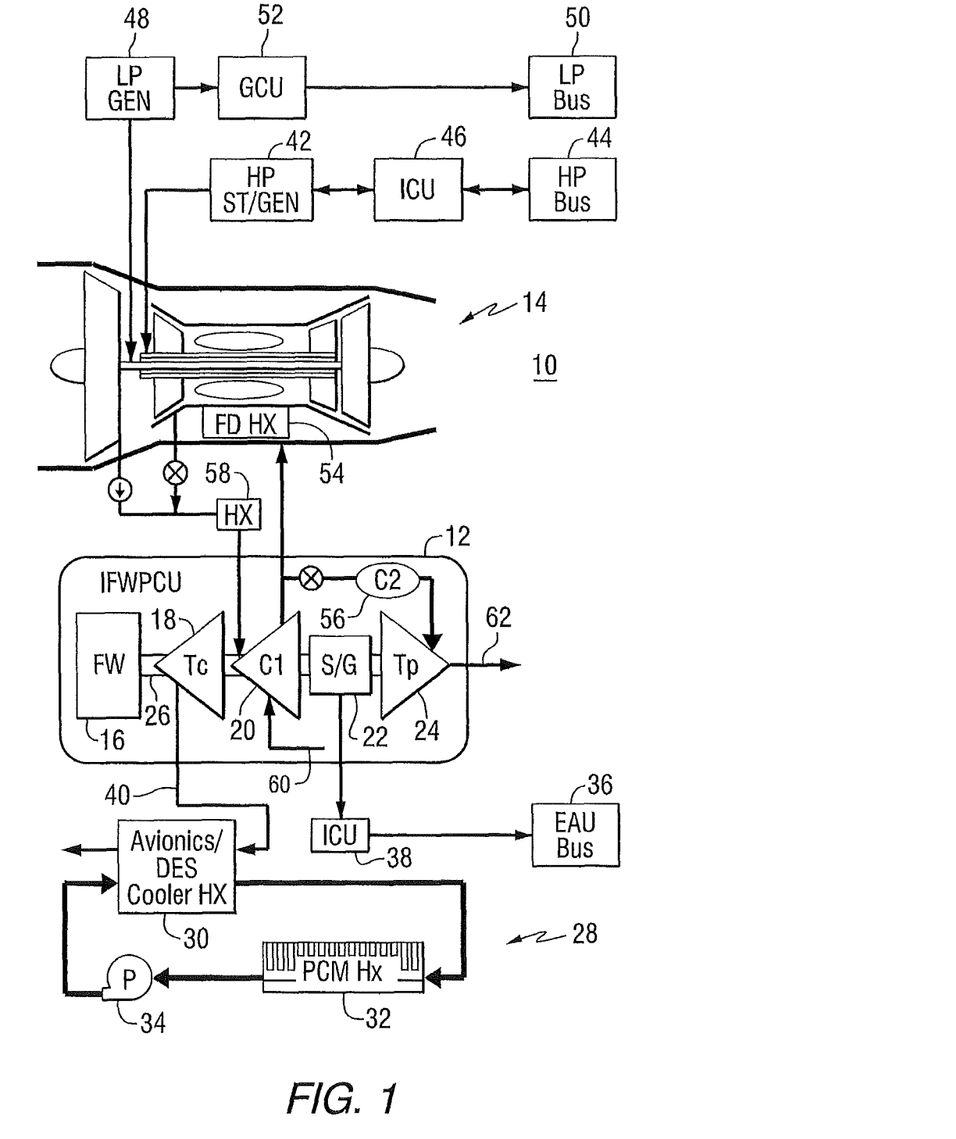
FIG. 1 is a schematic block diagram of an aircraft power generation system.

FIG. 1 is a schematic block diagram of portions of an aircraft electrical power system 10. The system includes an integrated flywheel power and cooling system 12 coupled to an aircraft engine 14. The integrated flywheel power and cooling system includes a flywheel 16, an expansion turbine 18, a compressor 20, a starter-generator 22, and a power turbine 24, all coupled to a common shaft 26. The IFWPCS can provide electrical power for various aircraft systems and temperature controlled air that can be used to cool equipment on the aircraft. In this example, the aircraft includes a directed energy system (DES). Cooling components 28 for the directed energy system include an avionics/DES heat exchanger 30 and a phase change material heat exchanger 32, connected to each other through a pump 34.

The starter generator in the integrated flywheel power and cooling system is connected to an energy accumulator unit (EAU) bus 36 through an inverter control unit (ICU) 38. Low pressure cool air comes out of the expansion turbine 18 and passes into the avionics/DES cooler heat exchanger through line 40.

A high pressure spool driven starter generator 42 (also called a first generator) is connected to the engine and also connected to a high power bus 44 (also referred to as a first bus) through an inverter control unit 46. A low pressure spool driven generator 48 (also called a second generator) is connected to the aircraft engine and is also connected to a low-power bus 50 (also referred to as a second bus) through a generator control unit 52. High pressure, warm air that comes out of the compressor 20 can be directed into a fan duct heat exchanger 54. Alternatively or additionally, this high-pressure warm air can be used as a supercharger in a combustor 56 to create more power. An additional heat exchanger 58 is connected between the engine and the input to the compressor 20. Compressor 20 receives engine bleed air or ambient air through input 60. Power turbine 24 is connected to an exhaust port 62.

The integrated flywheel power and cooling system is capable of providing both ground auxiliary power and in-flight emergency power, normal cooling, peak power for high power equipment, and energy storage to reduce transient load impact on the engine.

The integrated flywheel power and cooling system (IFWPCS) includes a flywheel that can be used to enable avionics cooling and to provide peak power for directed energy weapon operation. The flywheel provides energy storage, and the stored energy can be released when needed. The described system uses electrical power to provide cooling power and the flywheel can reduce the power demand on the engine during idle descent transition. The IFWPCS can also provide electrical power to high peak power equipment such as electronic attack and directed energy weapon systems.

Figure 2:
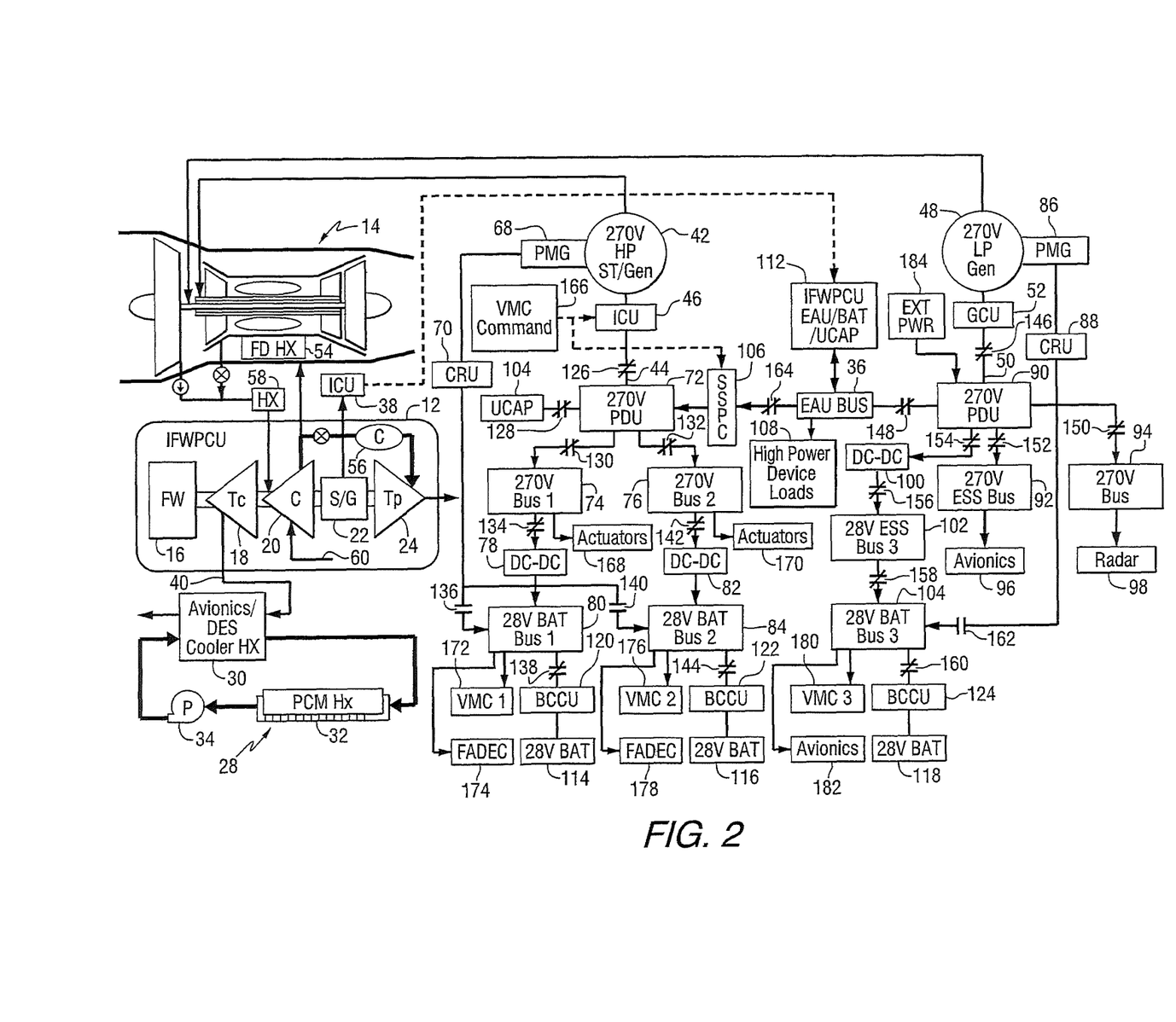
FIG. 2 is a schematic block diagram of an aircraft power distribution system in combination with the power generation system of FIG. 1.

The IFWPCS can be used in an electrical power system architecture that distributes the generated engine power to other systems. FIG. 2 is a schematic diagram of portions of an aircraft electrical power system that include the elements of FIG. 1 and further include power storage and distribution components. The high pressure spool driven starter-generator 42 is shown to include a permanent magnet generator 68 that is coupled to a converter/regulator unit 70. The inverter control unit 46 can be connected to a 270 volt power distribution unit 72 for the first bus 44. The power distribution unit 72 can be connected to a first 270 volt bus 74 and a second 270 volt bus 76. Bus 74 can be connected to DC-to-DC converter 78 that supplies voltage to a 28 volt bus 80. Bus 76 can be connected to DC-to-DC converter 82 that supplies voltage to a 28 volt bus 84.

The low pressure spool driven generator 48 is shown to include a permanent magnet generator 86 that is coupled to a converter/regulator unit 88. The low pressure spool driven generator 48 is also connected to a generator control unit 52. The generator control unit can be connected to a 270 volt power distribution unit 90 on the second bus 50. The 270 volt power distribution unit 90 can be connected to a first 270 volt bus 92 and a second 270 volt bus 94. Bus 92 can supply voltage to the aircraft avionics 96, and bus 94 can supply power to the aircraft radar 98. The power distribution unit 90 can be connected to DC-to-DC converter 100 that supplies voltage to a 28 volt bus 102. Bus 102 can be connected to a 28 volt bus 104.

The power distribution unit 72 can also be connected to an ultra capacitor 104 and a solid state power controller 106. In addition, the power distribution unit 90 can be connected to an energy accumulator unit bus 36 that can supply power to high power load devices 108. Inverter control unit 38 can be connected to the energy accumulator unit bus 36 through an energy accumulator unit bus/BAT/ultra capacitor 112.

Batteries 114, 116 and 118 can be connected to battery charger and control units 120, 126 and 124, respectively. Battery charger and control units 120, 122 and 124 can be connected to busses 80, 84 and 104, respectively. A plurality of switches 126, 128, 130, 132, 134, 136, 138, 140, 142, 144, 146, 148, 150, 152, 154, 156, 158, 160, 162 and 164, are provided to connect the various components of FIG. 2 under various operating scenarios. A power control command signal 166 can be supplied to the inverter control unit 46 and the solid state power controller 106. Bus 74 can supply power to actuators 168. Bus 76 can supply power to actuators 170. Bus 80 supplies voltage to a first vehicle management computer 172 and a first full authority digital engine controller 174. Bus 84 supplies voltage to a second vehicle management computer 176 and a second full authority digital engine controller 178. Bus 104 supplies voltage to a third vehicle management computer 180 and avionics 182. An external power source 184 such as a ground power service cart could be connected to power distribution unit 90 during aircraft maintenance or ground operation.

Figure 3:
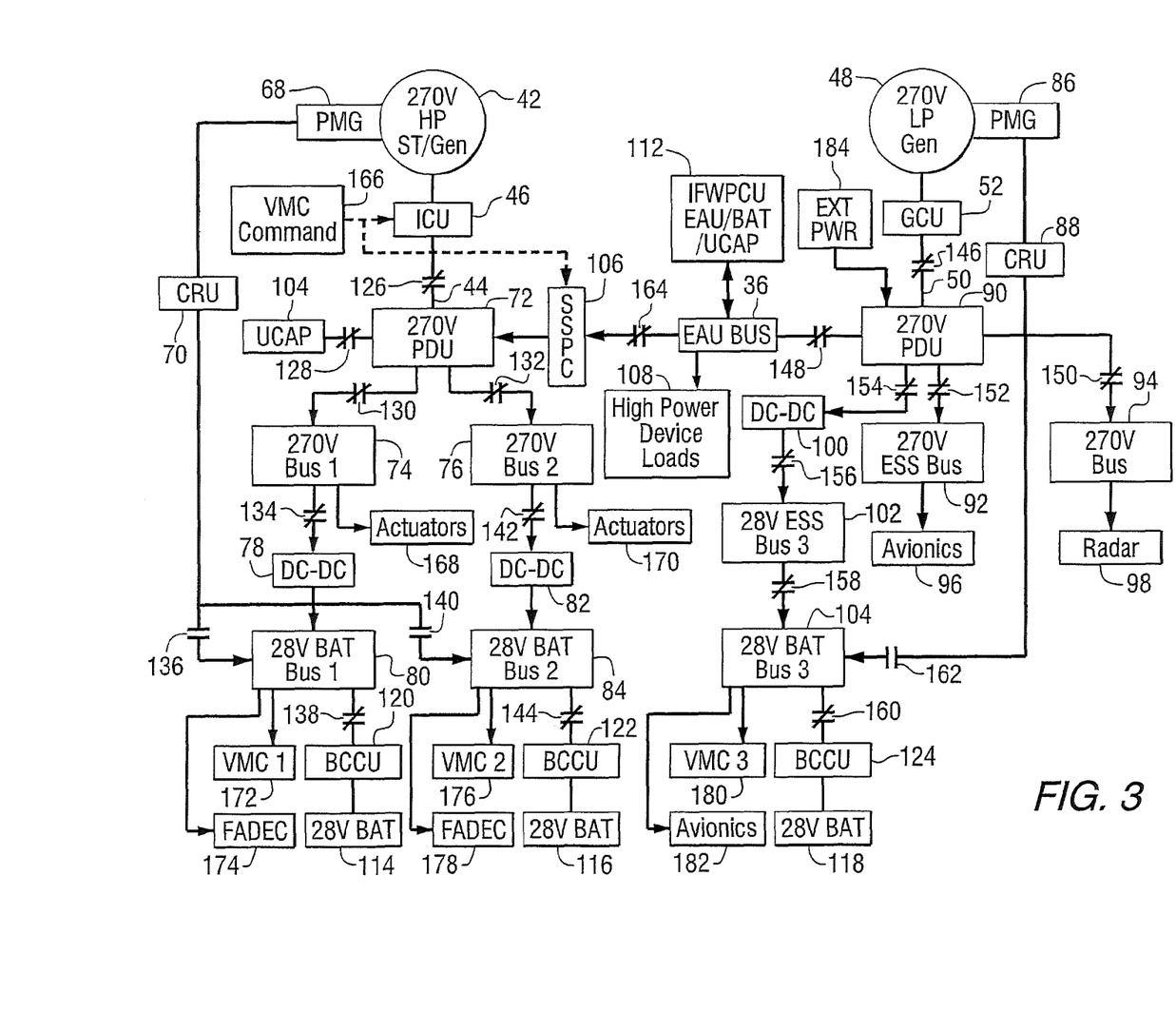
FIGS. 3 through 8 are schematic block diagrams of portions of an aircraft electrical power distribution system.

The power system architecture can manage engine power extraction and load matching and can be optimized for maximum efficiency. FIGS. 3-8 are schematic diagrams of portions of an aircraft power distribution system showing various operating modes. Abbreviations used in FIGS. 1-8 include:
BCCU: battery charger and control unit
SSPC: solid state power controller
EAU: energy accumulator unit
DC-DC: 270-28 VDC converter
CRU: converter/regulator unit
UCAP: ultra capacitor
PDU: power distribution unit
GCU: generator control unit
ICU: inverter convert unit
LP GEN: low pressure spool driven generator
HP ST/GEN: high pressure spool starter/generator
FD HX: fan duct heat exchanger
IFWPCU: integrated flywheel power and cooling unit
Tc: cooling turbine
C1: compressor
C2: combustor
S/G: starter/generator
Tp: power turbine
DES: direct energy system
P: pump
PCM Hx: phase change material
PMG: permanent magnet generator
CRU: converter regulator unit
ESS: essential bus
VMC: vehicle management computer
FADEC: full authority digital engine controller FIG. 3 shows a power distribution system that can be connected to an integrated flywheel power and cooling unit and includes an ultra capacitor 104 on the high pressure spool driven generator 42. The channel and EAU bus 36 supplied by either or a combination of the IFWPCU, a battery, an EAU, and an ultra-capacitor. The various energy storage components are connected through switches to reduce generator transient rating requirements. The ultra capacitor 104 reduces high pressure spool driven generator 42 transient rating requirements. The power from EAU bus 36 reduces low pressure spool driven generator 48 transient power rating requirements. FIG. 3 shows the normal power control operation mode of the electrical power distribution system. The SSPC is commanded to be off when power sharing is off so the power distribution unit 72 is disconnected from EAU bus 36 but in a standby mode that could be turned on in a few mini-seconds. The high pressure spool driven generator 42 would supply power to the power distribution unit 72 and is supplemented by ultra capacitor 104 to meet the continuous and transient power demands respectively. The low pressure spool driven generator 48 would provide power to power distribution unit 90 for the continuous loads and can be supplemented by the ultra capacitor (UCAP) and energy accumulator unit (EAU) 112 for the transient loads. In the event that the transient or the peak power of equipment such as the radar 95 exceeds the capability of the battery, UCAP and EAU 112, the IFWPCU energy stored in the flywheel would be converted into electrical power and supply power through EAU bus 38. In this scenario, the IFWPCU 12 handles high peak power for loads such as radar. Thus the low pressure spool driven generator 48 does not need to be oversized for the peak power requirements. This saves system weight and reduces cooling requirements that typically limit the generator output power rating.

The distribution system shown in FIG. 3 also enables energy optimization in vehicle operation. The SSPC 106 is used for optimizing the utilization of engine power extraction. Depending on the flight conditions of aircraft speed, altitude, and engine thrust requirements, the vehicle management computer (VMC) would determine the best operating configuration and turn on and off the power from high pressure spool driven generator 42 by commanding the ICU 46 and switching on/off the SSPC 106. The SSPC is used, rather than a conventional electrical power contactor since higher endurance life is required from such solid state device. This system enables using the lowest cost/penalty of engine power and thus provides high system efficiency. Analysis has shown the cost of extracting power from high pressure spool driven generator would have a higher fuel consumption penalty to the engine.

Figure 4:
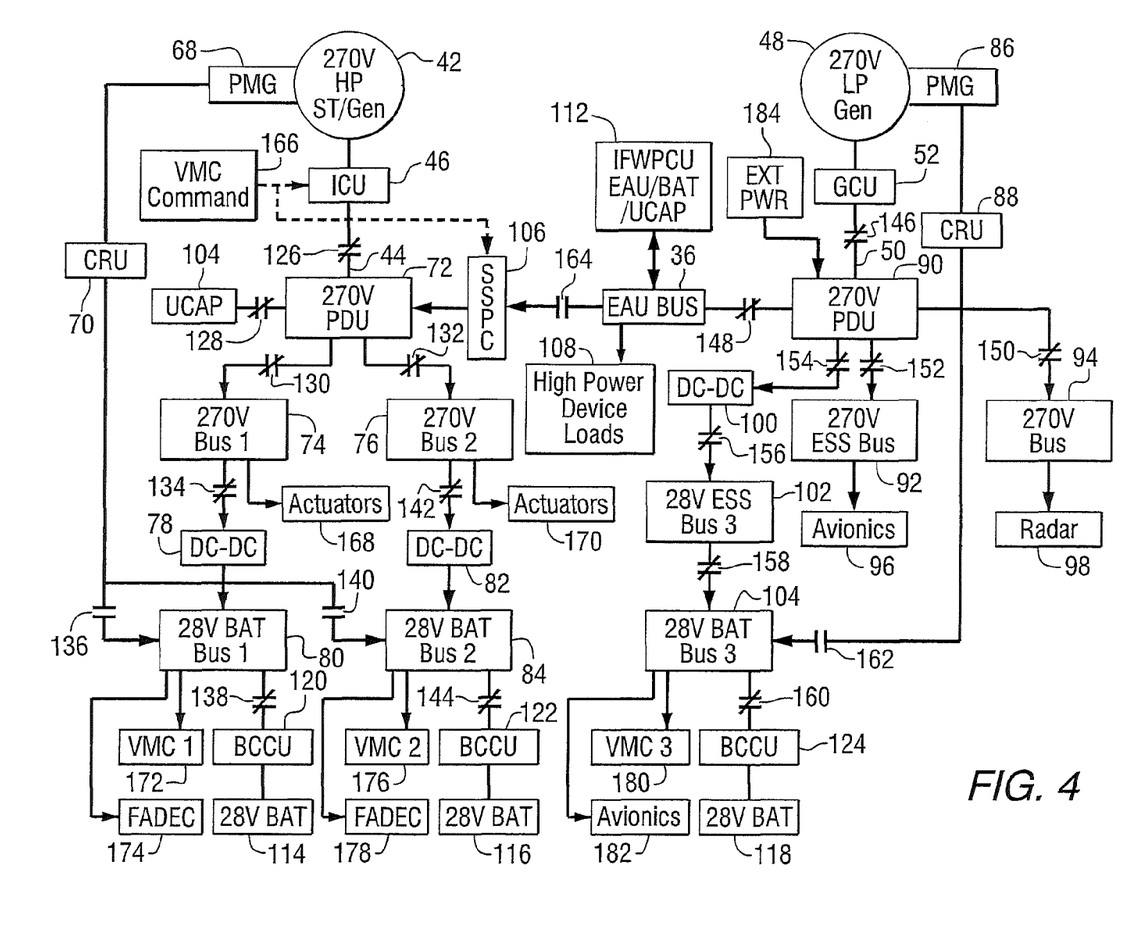

FIG. 4 shows the power distribution system of FIG. 3 wherein the 270 volt power distribution units are electrically disconnected from each other. FIG. 4 shows how the high pressure spool driven generator 42 channel is disconnected from the low pressure spool driven generator 48 channel. This configuration can be used in the event that a non-power control mode is more desired, such as if there is a fault in either channel. FIG. 4 differs from FIG. 3 in that contactor 164 is opened to allow the system to operate in the non-power controlled mode. The UCAP 104 still supports the high pressure spool driven generator 42 and the IFWPCU/EAU/BAT/UCAP 112 would supplement the low pressure spool driven generator 48. In the event that higher system integrity is more desirable than achieving higher system efficiency, the non-power controlled mode may be selected in lieu of the more energy efficient power control mode.

Figure 5:
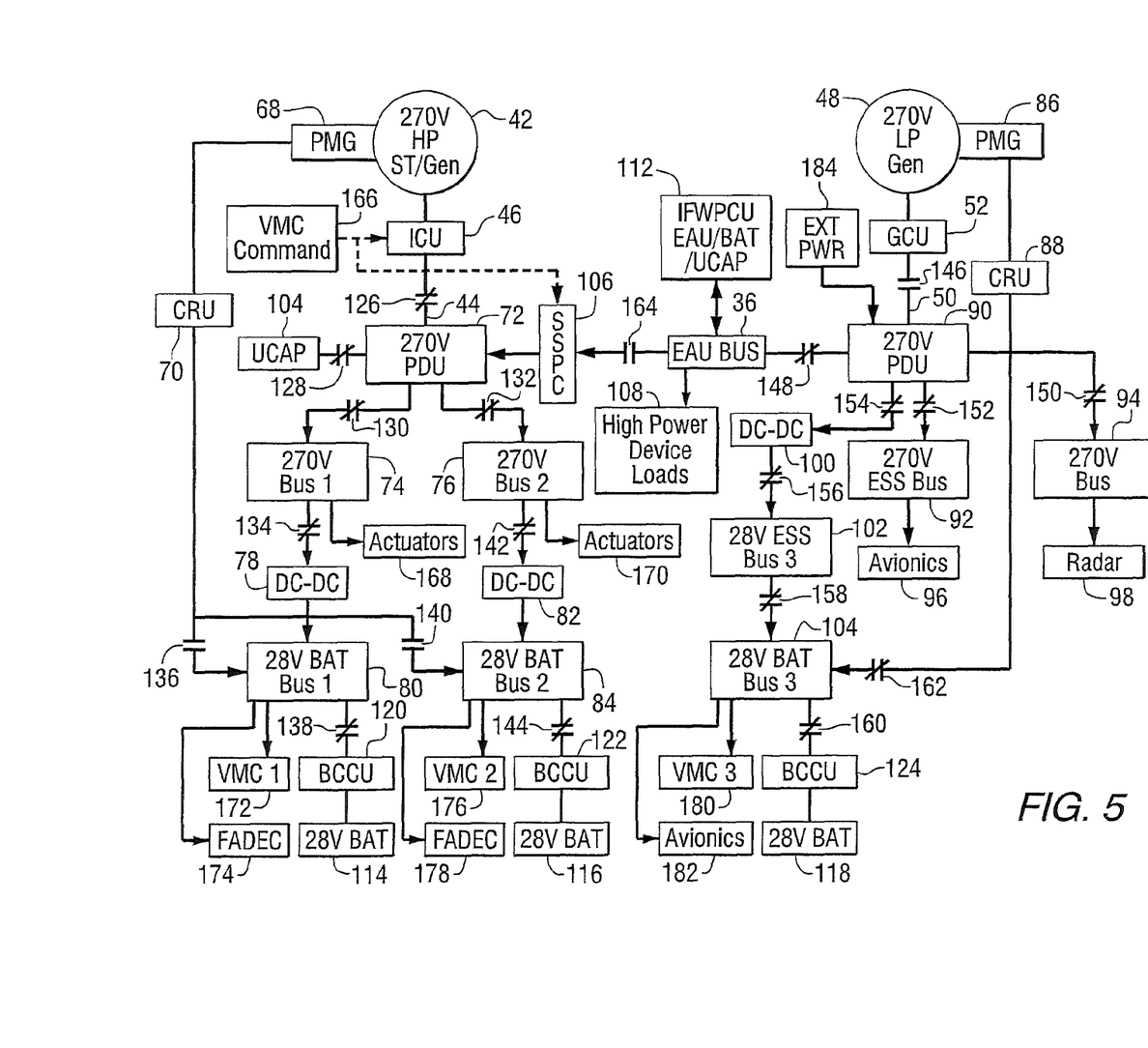

FIG. 5 shows the power distribution system of FIG. 3, wherein the IFWPCU provides power to a failed generator bus. FIG. 5 differs from FIG. 3 in that switches 146 and 164 are open, and switch 162 is closed. This switch configuration allows the IFWPCU to provide power to a failed generator bus. This configuration utilizes the PMG 86 to provide backup power to the VMC 180 through the CRU 88. This configuration is used to continue providing power to the VMC channel for system reliability even if the low pressure spool driven generator 48 failed and needs to be disconnected from the bus 50.

Figure 6:
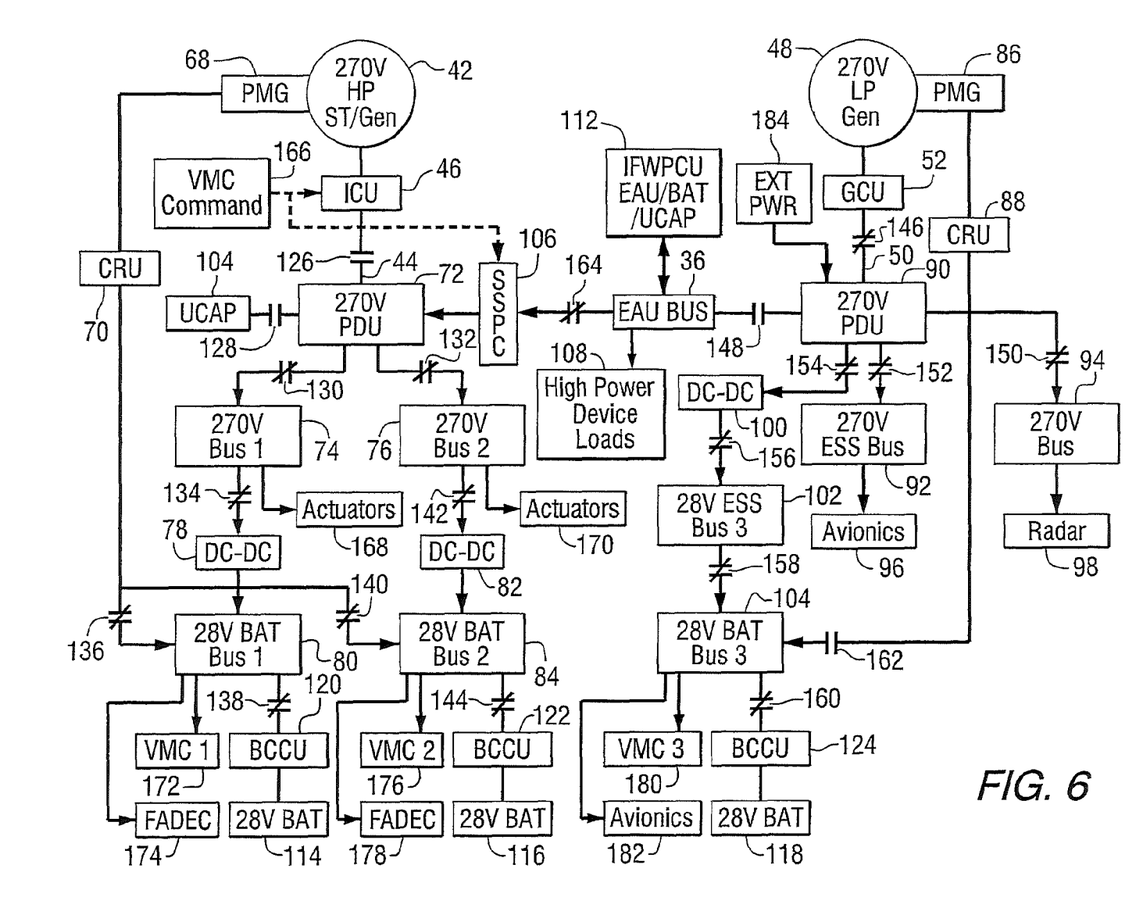

FIG. 6 shows the power distribution system of FIG. 3, wherein the IFWPCU provides power to a failed generator bus. FIG. 6 differs from FIG. 3 in that switches 126 and 128 are open, and switches 136 and 140 are closed. This configuration utilizes the PMG 68 to provide backup power to the VMC 172 and VMC 176 through the CRU 70. This configuration is used to continue providing power to the VMC channels for system reliability even if the high pressure spool driven generator 42 failed and needs to be disconnected from the bus.

Figure 7:
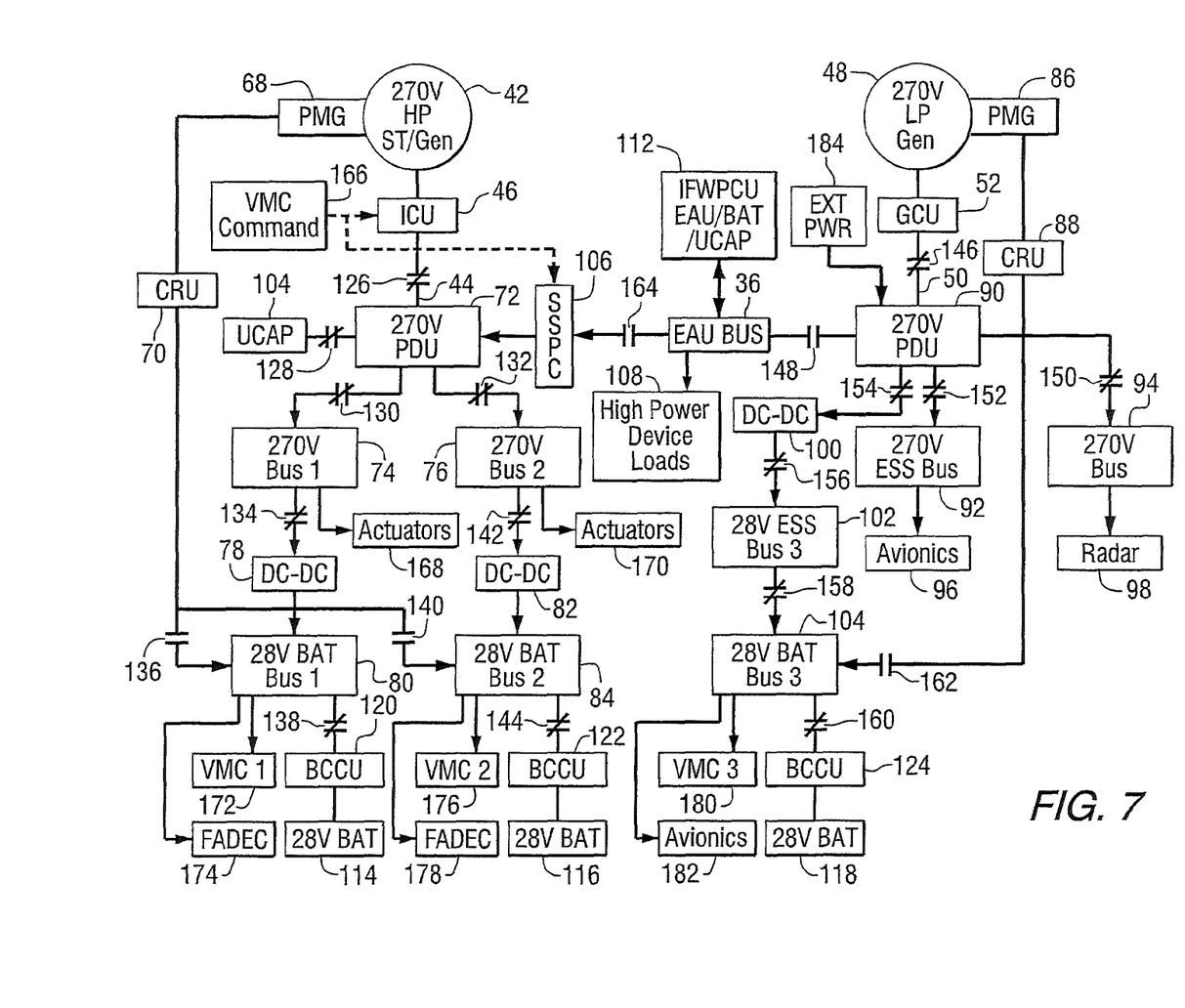

FIG. 7 shows the power distribution system of FIG. 3 configured to support the high power device operation. The various components are connected through switches to reduce generator transient rating requirements. FIG. 7 differs from FIG. 3 in that switches 148 and 164 are open. The high power device operation could have created power ripple effects and it is desired to isolate the high power devices from the other equipment to avoid additional filtering requirements or system operation impacts.

Figure 8:
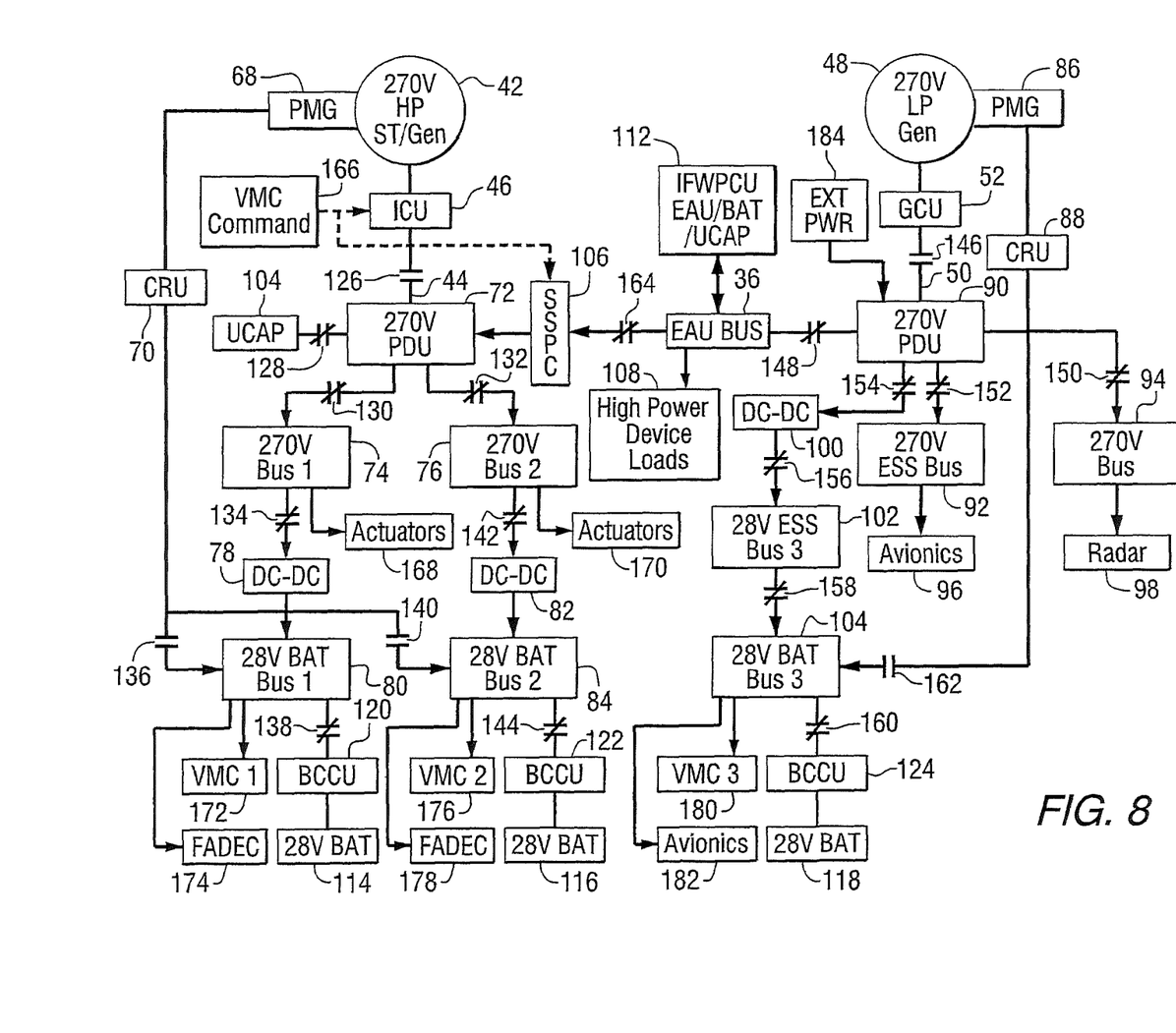

FIG. 8 shows the power distribution system of FIG. 3 configured for an engine out scenario. FIG. 8 differs from FIG. 3 in that switches 126 and 146 are open. The IFWPCU 12 is turned on to provide the emergency power required at high altitude using either the energy stored in the flywheel or the EAU/Batter power until the aircraft could descend to the lower altitude. When a lower altitude is reached, the IFWPCU 12 would be able to take in sufficient ambient air to support a combustion mode and thus generate power to support the aircraft operation and engine 14 re-start. In the event that engine 14 is re-started, the aircraft could climb back to altitude or divert to a landing site.

In various embodiments, the IFWPCS combines a flywheel with the integrated power and cooling unit to provide the ground power and cooling; normal cooling; peak power at altitude by supercharging using engine bleed air; emergency power; and energy storage. The system management is executed by the VMC. The multi-channel VMC would monitor the system operation and commands the ICU 46, ICU 38, and GCU 52, all the contactors, and SSPC accordingly. The VMC also communicates with the engine full authority digital engine control (FADEC) to command the IFWPCU mode switching.

The IFWPCU supplies power like an auxiliary power unit using a power turbine. It also stores power in a flywheel, and for peak power it harvests kinetic energy from the flywheel using the generator. The kinetic energy stored in the flywheel can also be used for other purposes. For example, it can cool the directed energy system by expanding air using a cooling turbine, running it through a heat exchanger and compressing it to go back through the Fan Duct Heat Exchanger. In the example of FIG. 1, the flywheel, compressors, generator and power turbine are all on the same shaft (i.e., with no gears) and can operate at 30-40 kRPM.

The flywheel could be constructed by leveraging many state-of-the-art developments. The flywheel can be constructed with a composite hub and high strength material in the rim to achieve a desired material density and moment of inertia. The flywheel would be operated at high speed and is a good match to the IFWPCU 12 since the turbo-machine would operate in a similar speed range. The flywheel could be spun up using battery power or ground power before the IFWPCU 12 enters the combustion mode to burn fuel to generate power. This could facilitate the IFWPCU startup since flywheel speed could be built up gradually, thus reducing the power required for starting.

The flywheel allows for a reduction in IFWPCU starter/generator size for engine starting. The flywheel also enables a reduction of engine bleed air or power extraction during idle descent and maintains stall margin during throttle transients. Peak engine bleed air and power extraction could force the operating points closer to the turbo-machine operation stall limits. A stalled turbo-machine could have detrimental effects on the engine operation and a strict operating margin is mandated to assure safe operation. The peak power loads would demand a system capable of higher margin just to support the occasional demands. The flywheel and EAU/Battery system would handle the peak loads thus mitigating the need for the engine to operate closer to the stall margin if over-design is not implemented.

A flywheel enabled EAU provides the transient and peak power required to support high power devices. A supercharged IFWPCU enables high power generation at high altitude.

The drawings show a detailed architecture for storing and distributing power for peak energy in an aircraft implementation that uses a single shaft to run the generator to create steady electric power from the power turbine on the shaft. A flywheel is used to store energy, allowing for harvesting peak electric power from the flywheel using the generator when demanded by a peak power load. Expander and compressor turbines are run to create cooling by cycling between a fan duct (heat sink) and a directed energy system or avionics (heat source).

The integrated power and cooling system is capable of multi-function operation, including providing ground auxiliary power and in-flight emergency power, normal cooling, peak power for high power equipment, and energy storage to reduce transient load impact to the engine.

The cooling and power system is integrated with a flywheel to enable vehicle avionics cooling and to provide peak power for direct energy weapon operation. The flywheel enables energy storage and releasing when needed. The system can use electrical power to provide cooling power and the flywheel can reduce the power demand to the engine during idle descent transition. The electrical power system architecture distributes the engine power generation and the IFWPCS power to support high peak power equipment such as electronic attack and direct energy weapon systems.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein.

While the invention has been described in terms of several embodiments, it will be apparent to those skilled in the art that various changes can be made to the described embodiments without departing from the scope of the invention as set forth in the following claims.

What is claimed is:

1. An apparatus for providing electrical power and cooling for an aircraft, the apparatus comprising:
   a cooling turbine connected to a shaft;
   a compressor connected to the shaft, and including an input for receiving engine bleed air or ambient air, and an output for discharging compressed air;
   a flywheel connected to the shaft;
   a power turbine connected to the shaft; and
   a starter generator connected to the shaft between the compressor and the power turbine, wherein during periods of transient or peak power requirements, kinetic energy stored in the flywheel is converted into electrical power by the starter generator.

2. The apparatus of claim 1, further comprising:
   a combustion chamber coupled to the power turbine; and
   a valve for connecting the combustion chamber to the output of the compressor.

3. The apparatus of claim 1, wherein the starter generator is connected to an energy accumulator unit bus through an inverter control unit.

4. The apparatus of claim 3, further comprising:
   a power distribution system connected to receive electrical power from the energy accumulator unit bus.

5. An apparatus for providing electrical power and cooling for an aircraft, the apparatus comprising:
   a cooling turbine coupled to a shaft;
   a compressor coupled to the shaft, and including an input for receiving engine bleed air or ambient air, and an output for discharging compressed air;
   a flywheel coupled to the shaft;
   a power turbine coupled to the shaft; and
   a starter generator coupled to the shaft between the compressor and the power turbine, wherein the power distribution system comprises:
      a first generator configured to supply power to a first power distribution unit;
      a second generator configured to supply power to a second power distribution unit;
      a first switch for connecting an energy accumulator unit bus to the first power distribution unit; and
      a second switch for connecting the energy accumulator unit bus to the second power distribution unit.

6. The apparatus of claim 5, further comprising:
   a solid state power controller connected between the first switch and the first power distribution unit.

7. The apparatus of claim 6, further comprising:
   an inverter control unit connected between the first generator and the first power distribution unit; and
   a vehicle management computer configured to provide control signals to the inverter control unit and the solid state power controller.

8. The apparatus of claim 7, further comprising:
   a first permanent magnet generator coupled to the first generator; and
   a first converter regulator unit connected to transmit electrical power from the first permanent magnet generator to the vehicle management computer.

9. The apparatus of claim 8, further comprising:
   a second permanent magnet generator coupled to the second generator; and
   a second converter regulator unit connected to transmit electrical power from the first permanent magnet generator to a second vehicle management computer.

10. The apparatus of claim 5, further comprising:
    a first ultra capacitor; and
    a third switch for connecting the first ultra capacitor to the first power distribution unit.

11. The apparatus of claim 10, further comprising:
    a second ultra capacitor connected to the energy accumulator unit bus.

* * * * *